United States Patent [19]

Hill

[11] Patent Number: 5,063,808
[45] Date of Patent: Nov. 12, 1991

[54] LINEAR ACTUATOR IMPROVEMENT TO PREVENT "BACK DRIVING"

[75] Inventor: Jason J. Hill, Manchester, Mo.

[73] Assignee: Emerson Electric Co., St. Louis, Mo.

[21] Appl. No.: 512,354

[22] Filed: Apr. 23, 1990

[51] Int. Cl.$^5$ .............................................. F16H 57/10
[52] U.S. Cl. ........................................... 74/411.5; 5/66
[58] Field of Search ...................... 5/66; 74/25, 89.14, 74/411.5

[56] References Cited

U.S. PATENT DOCUMENTS

| | | | |
|---|---|---|---|
| 3,485,109 | 12/1969 | Dunlap | 74/411.5 X |
| 3,621,731 | 11/1971 | Houss | 74/411.5 |
| 4,395,786 | 8/1983 | Casey et al. | 5/66 |
| 4,635,491 | 1/1987 | Yamons et al. | 74/411.5 X |

Primary Examiner—Richard E. Moore
Attorney, Agent, or Firm—Polster, Polster and Lucchesi

[57] ABSTRACT

An improvement (17) for a linear actuator mechanism (1) includes a brake mechanism (19) acting on an intermediate gear (39) of a gear mechanism (21) of the actuator. The brake mechanism includes a spring washer (61) installed on a gear shaft (53) and thrust washers (59) mounted on the gear shaft on each side of the gear. A constant force is exerted on the gear by the brake mechanism to eliminate "back drive" forces operating on a lead screw (5) of the actuator when its motor (7) is de-energized.

8 Claims, 2 Drawing Sheets

LINEAR ACTUATOR IMPROVEMENT TO PREVENT "BACK DRIVING"

BACKGROUND OF THE INVENTION

This invention relates to linear actuators and more particularly, to an improvement to such an actuator for preventing back driving of the actuator's lead screw.

Linear actuators are well known in the art and have a variety of uses. Typically, the actuator has a reversible motor, a threaded, elongate lead screw, and a gear mechanism for rotating the screw in an appropriate direction depending upon motor rotation. In certain applications the screw is connected to a member which, in turn, produces a desired movement as the lead screw moves it in one direction or another. The linear direction of member movement is thus relative to the direction of screw rotation. The gear mechanism typically includes a gear connected to the motor or integral with the motor's output shaft, one or more intermediate gears, and a drive gear which is connected to the lead screw. Typically the motor is energized until the member moves a desired distance; then, the motor is shut off. Upon de-energization, a back drifting or reverse driving movement may occur such that the member moves backward some distance. This results in the overall displacement of the member being incorrect, and if precise positioning is important, this can create problems.

This drifting under no power conditions has been previously recognized as an undesirable effect. To correct it, various braking systems have been employed. Usually, these work on the motor rotor, or on the shaft of the lead screw. While the former system is the most effective, it is also the most expensive. The latter, while perhaps cheaper, works on the least effective point at which to brake. What is needed therefore is a braking mechanism which not only works well but is also cost effective.

SUMMARY OF THE INVENTION

It is an object of the present invention to provide an improvement to a linear actuator to prevent back driving of a lead screw of the actuator when a motor of the actuator is de-energized.

It is further an object of the invention to provide such an improvement which is a braking system acting on the gear mechanism of the actuator.

It is also an object of the invention to provide an improvement which is low cost, effective, and does not require any modification to the actuator, its components, or the housing in which they are installed.

The improvement, briefly stated, is for a linear actuator mechanism having a lead screw, a reversible motor for selectively driving the screw in one direction or the other, and a gear mechanism interconnecting the motor and screw. The improvement comprises brake means for preventing back driving of the screw when the motor is de-energized. The gear train includes a drive gear and at least one intermediate gear. The brake means acts to increase rotational resistance on the intermediate gear to eliminate the back drive potential thereof.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
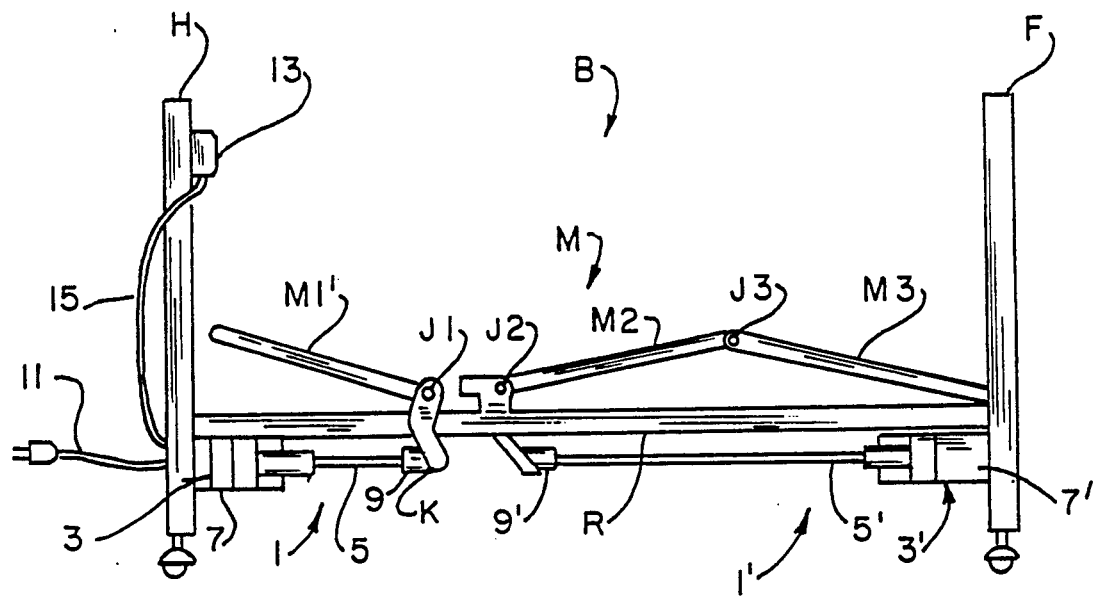
FIG. 1 is an elevational view of a bed with a linear actuator incorporating the improvement of the present invention.
Figure 3:
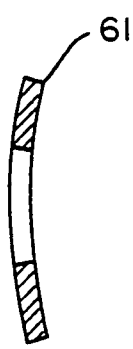
FIG. 3 is a sectional view of a spring member comprising a portion of the improvement.
Figure 4:
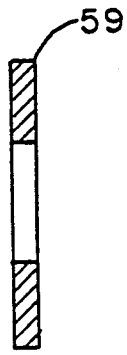
FIG. 4 is a sectional view of a thrust washer used with the improvement.

Referring to FIG. 1, an article of furniture such as a bed B has a headboard H and a footboard F. The bed further has side rails R one of which is shown in FIG. 1. The bed has a mattress frame M comprised of a first end section M1, a middle section M2, and second end section M3. The frame sections are appropriately hinged at J1, J2, and J3 so the various sections of the mattress frame can be adjusted, i.e. raised or lowered. Adjustment of the mattress frame to raise and lower the various end sections is achieved using a linear actuator mechanism 1, two of which (1 and 1') are shown in the drawings. While only one linear actuator mechanism will be described, it will be understood that both mechanisms function in a similar manner. As shown, a bracket K depends beneath end section M1 of the mattress frame. Mechanism 1 includes a motor and gear housing 3 attached to the bed beneath the mattress; i.e., the mechanism is connected to a side rail R or end rail (not shown) of the mattress frame. An acme screw 5 is coupled to a motor 7 (see FIG. 2) installed in the housing for selective rotation in one direction or the other by the motor. The distal end of screw 5 is received in the distal end of a drive tube 9. The other end of the drive tube is attached to the end of the bracket. Consequently, when the motor drives the screw in the direction to draw the tube further onto it, the end section of the mattress is raised. If the screw is driven in the opposite direction, the end section is lowered. The actuator has a power cord 11 for connection to an electrical outlet. In addition, a switch 13 is conveniently located (for example, mounted on the headboard) for the user to raise or lower the bed. The switch unit is connected to the motor by a control line 15.

While the above description is with respect to a bed, it will be understood that the linear actuator mechanism can be used in other applications such as lift chairs, dental chairs, lift tables, etc.

Because of the forces created when the motor is energized and the lead screw is turning, de-energization of the motor often results in "back driving" occurring. That is, there is a counterrotation which occurs that causes the lead screw to move in the opposite direction to that in which it was being driven. In the bed shown in FIG. 1, this results in the mattress position changing from that to which it was adjusted. To prevent backdriving, brakes have been used on the output shaft of the lead screw. These, however, have not been effective. Brakes have also been used with the rotor of the actuator motor. These are effective, but expensive.

Figures 2, 5:
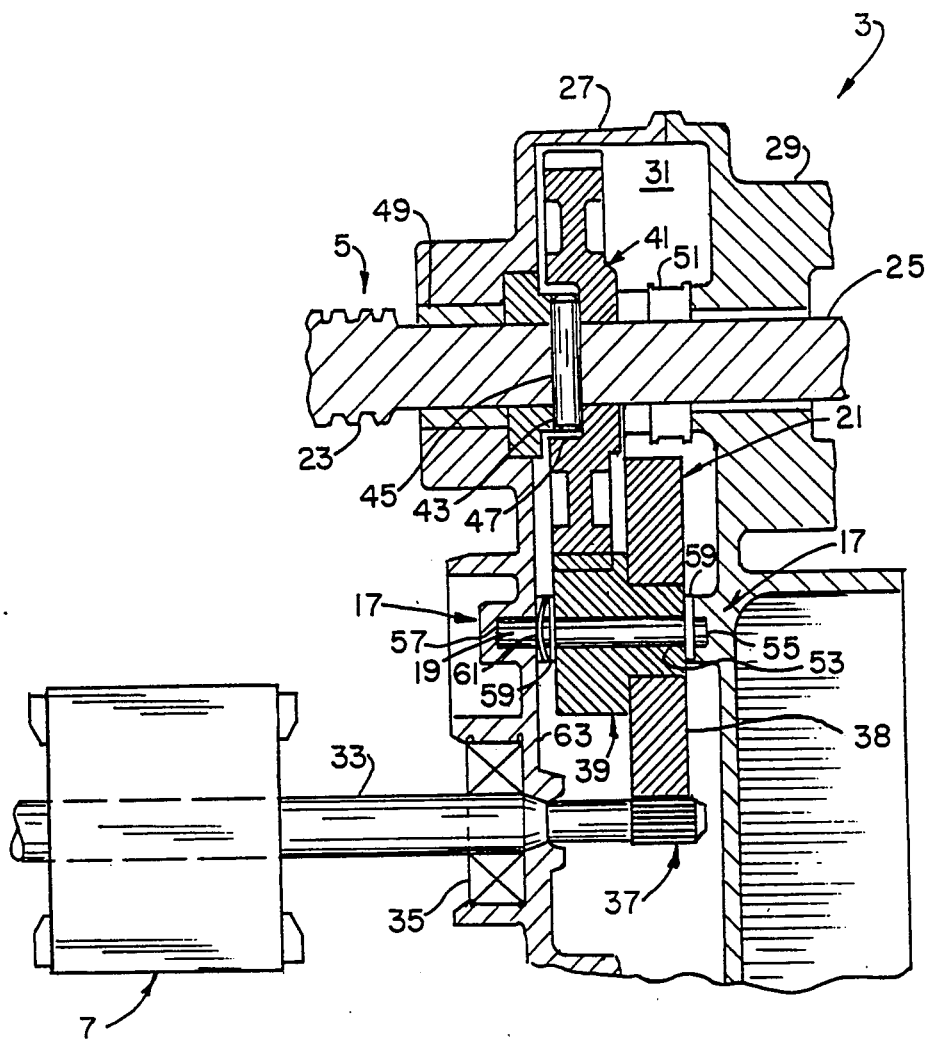
FIG. 2 is a partial sectional view of the gear mechanism of the linear actuator, with separate gear construction, illustrating the improvement.
FIG. 5 is a sectional view illustrating installation of the improvement shown with an integral gear construction.

An improvement 17 of the present invention comprises a brake means 19 usable with a gear train 21 of the linear actuator to effect a braking force sufficient to prevent back driving of the lead screw when the actuator motor is de-energized. As shown in FIG. 2, lead screw 5 has a threaded section 23 and a shank 25. The shank is installed in housing 3 of the actuator. The housing has a first housing section 27 and a second housing section 29. Together these sections define a housing 31 in which the gear mechanism is installed. The motor has an output shaft 33 supported by a bearing assembly 35. A pinion gear 37 formed on the outer end of the shaft meshes with a first intermediate gear 38. Gear 38 meshes with a second intermediate gear 39. This gear, in turn, meshes with a output or drive gear 41. As seen in FIG. 2, a drive pin 43 extends through a transverse bore 45 in shank 25 and the pin is captured in a recess 47 formed in gear 41. In addition, the lead screw is supported by a bushing 49 on one side of the gear train and by a bearing assembly 51 on the other side thereof. It will be understood that the gear train may include more or fewer gears than above described.

As shown in FIGS. 2 and 5, intermediate gear 39 is mounted on a shaft 53. The ends of the shaft are received in respective pockets 55 and 57 formed in walls of the respective housing sections A thrust washer 59 is installed on shaft 53, one such washer being installed on each side of the gear. In addition, a spring wave washer 61 is installed on the shaft between the thrust washer and an interior wall 63 of housing section 27. When the actuator housing sections are joined, compression of washer 61 creates a constant force on gear 39 which overcomes any force exerted back through the gear train when the motor is de-energized that would cause back driving of the lead screw. The force exerted by washer 61 has a negligible effect on normal actuator operation to drive screw 5 in the desired direction.

As shown in FIG. 5 the intermediate gears may be integrally formed so pinion gear 37 meshes with intermediate gear 39. Gear 39 may be either a metallic-gear or a plastic molded gear. The brake means may be employed with either type gear and is effective to eliminate back driving regardless of the type gear with which it is used.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A linear actuator comprising:
    a lead screw and a housing in which a portion of the lead screw is received;
    a reversible motor for selectively drawing the lead screw in either direction depending upon the direction of motor rotation;
    a gear mechanism interconnecting the motor and the lead screw for rotation of the lead screw in response to motor rotation, the gear mechanism comprising a drive gear, a driven gear, and at least one intermediate gear; and,
    brake means acting to increase the rotational resistance of the intermediate gear to substantially eliminate the back drive potential thereof, the brake means including spring means acting on the intermediate gear to exert a constant force thereon which is sufficient to overcome back driving forces transmitted back through the gear mechanism, the spring means including a spring washer mounted on a shaft adjacent one wall of the housing.

2. The improvement of claim 1 wherein the housing is comprised of first and second housing sections, the spring washer being compressed by the housing sections, when they are joined, to exert a force on the intermediate gear.

3. The improvement of claim 2 wherein the brake means further includes a pair of thrust washers one of which is mounted on the shaft on each side of the gear.

4. In an article of furniture having a first element thereof movable with respect to a second element thereof, a mechanism interconnected with the elements for producing the movement, comprising:
    a linear actuator connected to one of the elements and having a lead screw for moving a member attached to the other element;
    a reversible motor for driving the lead screw in one direction or the other,
    a gear mechanism for producing movement of the lead screw in response to motor rotation, the gear mechanism including a drive gear, or driven gear, and at least on intermediate gear, and a housing for the gears; and
    brake means acting to increase rotational resistance on the intermediate gear to substantially eliminate the back drive potential thereof, the braking means including spring means acting on the intermediate gear to exert a constant force thereon, the spring means including a spring washer mounted on a gear shaft adjacent one wall of the housing.

5. The improvement of claim 4 wherein the brake means further includes a pair of thrust washers one of which is mounted on the shaft on each side of the gear.

6. A braking mechanism for a linear actuator assembly which is used to position one object relative to another, the braking mechanism acting to prevent back driving of the linear actuator assembly which could result in inaccurate placement of the one object relative to the other, the linear actuator assembly including a lead screw for effecting movement of one of the objects to position it relative to the other, a motor for producing rotation of the lead screw, a gear mechanism connecting the motor and lead screw and including a drive gear, a driven gear, and an intermediate gear, and a housing in which the gear mechanism is assembled wherein the braking mechanism comprises a spring washer mounted on a gear shaft for the intermediate gear to exert a constant force thereon.

7. In a linear actuator assembly having a lead screw and a motor for producing rotation of the lead screw, the improvement comprising a drive gear attached to an output shaft of the motor, a driven gear to which the lead screw is attached, and an intermediate gear for coupling between the drive gear and the driven gear, the intermediate gear being mounted on a shaft the ends of which are journaled for rotation of the shaft and the intermediate gear in response to motor rotation, and brake means for increasing the resistance to rotation of the intermediate gear after motor operation ceases, thereby to prevent back driving of the lead screw, the braking means including a spring washer mounted on the same shaft as that on which the intermediate gear is mounted.

8. The improvement of claim 7 further including a housing in which the gears are assembled, the housing having opposed side walls in which respective ends of the shaft are received, and at least one thrust washer mounted on the shaft on the same side thereof as the spring washer is mounted, whereby the spring washer is compressed between the thrust washer and the adjacent side wall of the housing to create a constant braking force on movement of the intermediate gear to eliminate back driving of the lead screw.

* * * * *